United States Patent
Raman et al.

(10) Patent No.: US 9,244,530 B1
(45) Date of Patent: Jan. 26, 2016

(54) VIRTUAL ARTIFACTS USING MOBILE DEVICES

(75) Inventors: T. V. Raman, San Jose, CA (US); Chaitanya Gharpure, Mountain View, CA (US); Charles L. Chen, San Jose, CA (US)

(73) Assignee: Google Inc., Mountain View, CA (US)

( * ) Notice: Subject to any disclaimer, the term of this patent is extended or adjusted under 35 U.S.C. 154(b) by 238 days.

(21) Appl. No.: 13/017,614

(22) Filed: Jan. 31, 2011

(51) Int. Cl.
G06F 3/041 (2006.01)
G06F 3/01 (2006.01)
G06F 3/0488 (2013.01)
G06F 3/0481 (2013.01)

(52) U.S. Cl.
CPC .............. G06F 3/016 (2013.01); G06F 3/0488 (2013.01); *G06F 3/04812* (2013.01); *G06F 2203/014* (2013.01)

(58) Field of Classification Search
CPC ... G09F 3/0488; G09F 3/04812; G09F 3/016; G06F 2203/014
USPC .................................................. 345/156–184
See application file for complete search history.

(56) References Cited

U.S. PATENT DOCUMENTS

| | | | | |
|---|---|---|---|---|
| 7,295,185 | B2 * | 11/2007 | Wang | 345/164 |
| 7,788,032 | B2 * | 8/2010 | Moloney | 701/213 |
| 8,471,690 | B2 | 6/2013 | Henning et al. | |
| 2004/0218104 | A1 | 11/2004 | Smith et al. | |
| 2005/0212753 | A1 | 9/2005 | Marvit et al. | |
| 2006/0026521 | A1 * | 2/2006 | Hotelling et al. | 715/702 |
| 2007/0152984 | A1 * | 7/2007 | Ording et al. | 345/173 |
| 2008/0076368 | A1 * | 3/2008 | Arrasvuori | 455/186.1 |
| 2009/0252311 | A1 | 10/2009 | Kuiken | |
| 2010/0001980 | A1 * | 1/2010 | Kim et al. | 345/184 |
| 2010/0134312 | A1 * | 6/2010 | Park et al. | 340/689 |
| 2010/0214211 | A1 * | 8/2010 | Dods et al. | 345/156 |
| 2011/0043469 | A1 * | 2/2011 | Kim et al. | 345/173 |
| 2012/0032881 | A1 * | 2/2012 | Le Phan | 345/157 |

FOREIGN PATENT DOCUMENTS

WO WO 2010/045498 4/2010

* cited by examiner

*Primary Examiner* — Jimmy H Nguyen
(74) *Attorney, Agent, or Firm* — Fish & Richardson P.C.

(57) ABSTRACT

Methods, systems, and apparatus, including computer programs encoded on a computer storage medium, for providing virtual artifacts using mobile devices. In one aspect, methods include receiving a signal indicating user input to a touchscreen display of a mobile computing device, detecting motion of the mobile computing device, the motion mimicking motion associated with a physical artifact, identifying a function based on the user input and the motion, the function corresponding to a function that can be physically performed using the physical artifact, executing the function on the mobile device, and generating feedback to a user of the mobile device, the feedback indicating execution of the function.

22 Claims, 8 Drawing Sheets

VIRTUAL ARTIFACTS USING MOBILE DEVICES

BACKGROUND

This specification generally relates to tactile user interfaces for portable communications and computing devices.

Mobile computing continues to grow quickly as mobile computing devices, such as smart phones, add more power and more features. Users of such devices may now access various services on the internet, such as mapping applications, electronic mail, text messaging, various telephone services, general web browsing, music and video viewing, and similar such services. Users can interact with the devices using physical buttons or controls included with their mobile device. In addition, users can interact with the devices through various types of controls upon the surface of the devices, such as buttons, directional pads, and trackballs, as well as touchscreen interfaces. As mobile devices continue to shrink in size, there can be the accompanying loss of physical buttons. Therefore, a variety of additional user interface affordances can be implemented that enable user input.

In addition, interaction with a mobile device may occur in a variety of situations, in varying levels of concentration for a user. At one end of a spectrum, a user may be able to provide full attention to their device, such as when they are at their desk or riding on mass transit. At the other end of the spectrum, a user may be busy having a conversation or driving their automobile, so that any interaction with their mobile device may require a minimum level of attention from the user.

SUMMARY

Implementations of the present disclosure are directed to methods and systems for implementing virtual artifacts (e.g., buttons, dials, knobs, switches, sliders, etc.) on mobile devices using a combination of motion and touch. The implementation of the virtual artifacts makes use of functions and facilities available on mobile devices such as touchscreen input and motion sensing. The implementation of the virtual artifacts can further combine the use of the mobile device functions and facilities with the knowledge and experience of the user. The user's past experience can be related to the use of the controls (e.g., buttons, dials, knobs, switches, sliders, etc.) associated with various types of electrical appliances (e.g., radios, televisions, ovens, etc.). The user can touch and manipulate the mobile device in order to perform certain activities on the device (e.g., vary a volume control, scroll through a contacts list, etc.). The virtual artifact can provide the user with feedback regarding the activity performed. The feedback can be visual (e.g., a point on a virtual knob displayed on a touchscreen display device included in the mobile device), auditory (e.g., the mobile device can produce a beeping sound), voice (e.g., the mobile device can speak the name of a selected contact) or haptic (e.g., the mobile device can vibrate). In some cases, the user can perform the desired function and receive feedback without having to look at the visual display.

In general, innovative aspects of the subject matter described in this specification may be embodied in methods that include the actions of receiving a signal indicating user input to a touchscreen display of a mobile computing device, detecting motion of the mobile computing device, the motion mimicking motion associated with a physical artifact, identifying a function based on the user input and the motion, the function corresponding to a function that can be physically performed using the physical artifact, executing the function on the mobile device, and generating feedback to a user of the mobile device, the feedback indicating execution of the function.

These and other implementations may each optionally include one or more of the following features. For instance, the feedback includes at least one of audible feedback and haptic feedback; the function includes adjusting a volume of sound generated using the mobile computing device; the motion includes motion in a direction and the adjusting comprises increasing the volume in response to the direction; the motion includes motion in a direction and the adjusting comprises decreasing the volume in response to the direction; the function includes scrolling through a list, the list including a plurality of entries; the motion includes motion in a direction and the scrolling includes scrolling in a scroll direction based on the direction; the actions further include displaying a representation of the physical artifact on the touch-screen display; the actions further include animating the representation based on the motion; the physical artifact includes at least one of a knob, a dial, a button, a slider and a switch; the feedback includes a cadence associated therewith; the actions further include determining a rate of the motion, the cadence being based on the rate; the actions further include executing an application on the mobile device, the function corresponding to the application; the application includes a music application and the function includes adjusting a volume of sound generated by the mobile computing device in response to the application; the application includes an Internet-radio application and the function includes changing a channel; the actions further include: determining a region of the touch-screen display associated with the user input, selecting an application for execution based on the region, and executing the application, wherein the function is associated with the application; the motion includes at least one of rotation, acceleration, linear movement, and tilting; generating feedback includes driving one or more motors of the mobile computing device to provide haptic feedback; the haptic feedback is generated along a first axis; the haptic feedback is further generated along a second axis; the actions further include receiving a signal generated by a sensor of the mobile computing device, the motion being determined based on the signal; the sensor is an accelerometer; and the user input and the motion occur simultaneously.

The details of one or more implementations of the subject matter described in this specification are set forth in the accompanying drawings and the description below. Other potential features, aspects, and advantages of the subject matter will become apparent from the description, the drawings, and the claims.

BRIEF DESCRIPTION OF THE DRAWINGS

Like reference numbers represent corresponding parts throughout.

DETAILED DESCRIPTION

Evolving mobile devices can exhibit decreased size along with updated electronic designs that may result in the elimination of physical controls (e.g., buttons, dials, knobs, switches, sliders, etc.) for use in controlling the mobile device. The elimination of the physical controls can allow for a more pleasing aesthetic design for the user. In accordance with the present disclosure, elimination of the physical controls may result in the substitution of virtual controls for use in controlling the mobile device. In some cases, the mobile device can implement a virtual control as a "soft button" using a touchscreen visual display of the mobile device. The user can view the display of the mobile device in order to use the virtual control (e.g., move a slider switch displayed on the touchscreen display by touching the knob of the switch and sliding it back and forth). In some cases, the virtual control may lack the feedback a user may be accustomed to when using a physical control (e.g., audible clicks as the user moves the slider switch).

A mobile device can include feedback generators such as sensors and actuators. A virtual artifact can combine the use of a feedback generator with a virtual control in order to provide a user with feedback as they use the virtual control. A variety of virtual artifacts can be created by combining haptic feedback (e.g., a rumble, tap, or vibration), spoken feedback (e.g., synthesized or digitized speech), audio feedback (e.g., tones, clicks, or beeps), and/or visual feedback (e.g., blinking, increased illumination, or color changes) with motion sensing using a sensor (e.g., an accelerometer, a gyroscope, a compass) included in the mobile device and touch-interaction using the touchscreen display of the mobile device. The virtual artifacts can mimic their physical world counterpart controls by providing effective user interaction affordances.

In addition, feedback provided to the user can indicate the registration of a selection represented by the virtual artifact in response to the input of the user. Such feedback may come in various forms, such as spoken (e.g., synthesized or digitized speech), auditory (e.g., tones or clicks), and/or tactile (e.g., rumble or tap) feedback, where the feedback is synchronized to the registration of the inputs. In addition to hearing the value of a control selection spoken, a user may also hear a short sound, synchronized with tactile feedback such as vibration. The feedback may improve the sensation of moving a virtual slider or pressing a virtual button. Although the system described here may be directed to eyes-free input modes, a visual indication may also be provided on the touchscreen of the mobile device. The visual indication can include highlighting the selection by increasing the intensity of its illumination on the touchscreen display, changing the color of the selection or highlighting the selection by providing a box around the selection.

Figure 1A:
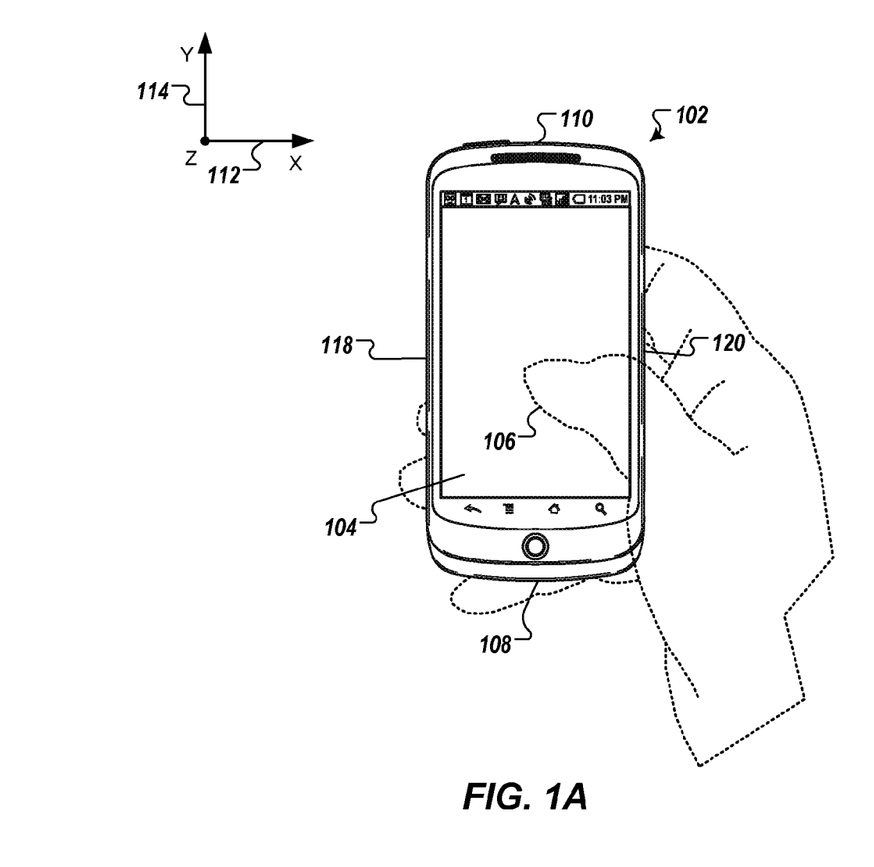
FIGS. 1A-B depict a user holding an example mobile device.
Figure 1B:
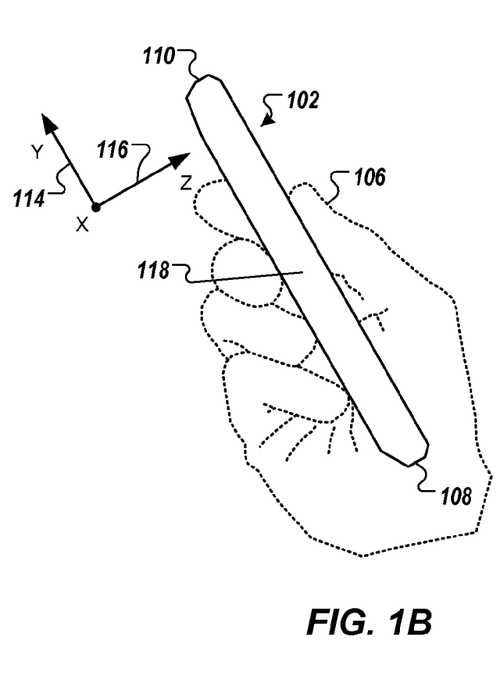

FIGS. 1A-B depict a user holding an example mobile device 102. The mobile device 102 includes a touchscreen display 104. A user can contact (e.g., a finger touch) the touchscreen display 104, as shown in FIG. 1A, while gripping the mobile device 102 as shown in FIG. 1B. In particular, the user can provide manual input to the touchscreen display 104 using a digit 106 (e.g., thumb and/or fingers). The user holds the mobile device 102 with a top 110 of the mobile device 102 orientated upward and a bottom 108 of the mobile device 102 orientated downward. The mobile device 102 includes sides 118, 120. In some cases, the user can hold the mobile device 102 in a landscape orientation (e.g., 90 degrees clockwise from the orientation shown in FIG. 1A), where the side 118 is oriented upward and side 120 is oriented downward. In some cases, the user can hold the mobile device 102 in a landscape orientation, where side 120 is oriented upward and side 118 is oriented downward.

The user can manipulate the mobile device 102 while the digit 106 remains in contact with the touchscreen display 104. In some implementations, the user can control various functions of the mobile device 102 by gripping the mobile device 102 as shown in FIGS. 1A and 1B and manipulating the mobile device 102 to control a virtual artifact. In some implementations, the location of the placement of the digit 106 on the touchscreen display 104 can select the application to run on the mobile device 102. The user can then control functions of the selected application by manipulating the mobile device 102 to control a virtual artifact.

FIGS. 1A-B illustrate a user gripping the mobile device 102 with their right hand. In some cases, a user may grip the mobile device 102 in a similar manner with their left hand. The user, whether holding the mobile device 102 in their right or left hand, can grip the mobile device 102 holding it in the same plane as an x-axis 112 and a y-axis 114. In some cases, while holding the mobile device 102 in the same plane as the x-axis 112 and the y-axis 114, the user can grip the mobile device 102 and hold it in line with the y-axis 114. In some cases, while holding the mobile device 102 in the same plane as the x-axis 112 and the y-axis 114, the user can grip the mobile device 102 and hold it in line with the x-axis 112.

Figure 2A:
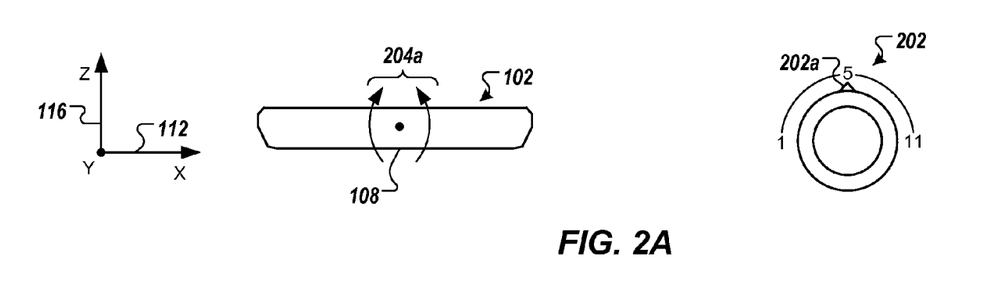
FIGS. 2A-C depict a virtual rotary dial using a mobile device.
Figure 2B:
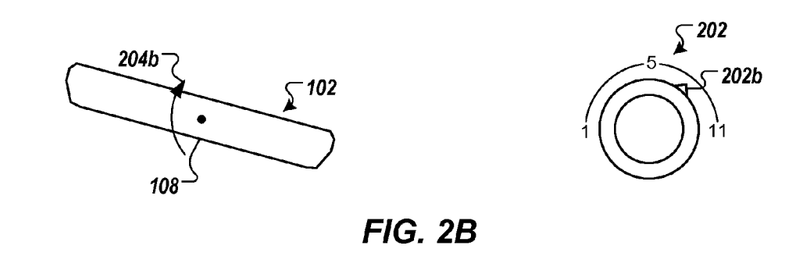
Figure 2C:
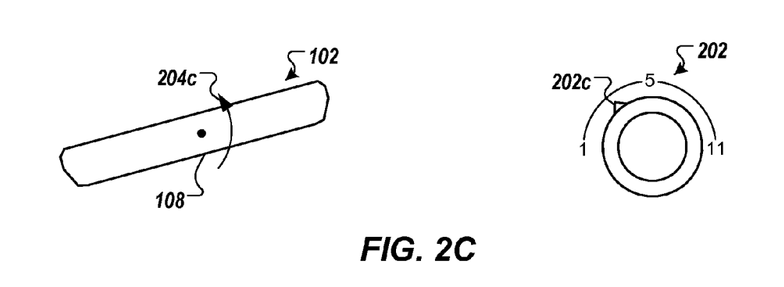

FIGS. 2A-C depict a virtual rotary dial 202 using the mobile device 102. Referring to FIG. 1A, and in some implementations, the mobile device 102 can display the virtual rotary dial 202 on the touchscreen display 104. It is appreciated, however, that the virtual rotary dial 202 need not be displayed. In the example shown in FIGS. 2A-C, the user grips the mobile device 102 as shown in FIGS. 1A-B. The user holds the mobile device 102 in a plane generally parallel to the x-axis 112 and the y-axis 114. FIGS. 2A-C illustrate rotation (as shown by arrows 204a-c) of the mobile device 102 as shown from the bottom 108 of the mobile device 102 and the respective resultant visual feedback (virtual positions 202a-c) on the virtual rotary dial 202 due to the rotation.

The virtual rotary dial 202 (a virtual artifact) can be analogous to a rotary dial (a physical artifact) found on analog radios, for example. In some implementations, the virtual rotary dial 202 can indicate a volume level of music being played by the mobile device 102 by providing visual feedback using the virtual rotary dial 202. The virtual rotary dial 202 can provide the visual feedback by mapping motion events received by the mobile device 102 to the virtual rotary dial 202, while the user is touching the edge of the touchscreen display 104 with their finger 106 and manipulating the mobile device 102. The user can manipulate the mobile device 102 in order to increase or decrease the volume level where their hand motion, while gripping the mobile device 102. This motion translates into the "turning" of the virtual rotary dial 202 clockwise or counterclockwise, respectively.

FIG. 2A illustrates an example initial position 202a of the virtual rotary dial 202, while the user holds the mobile device 102 in a position generally parallel to the y-axis. In some implementations, the initial position 202a for the virtual rotary dial 202 may not be the center position of the virtual rotary dial 202 as illustrated in FIG. 2A, but may be the position of the virtual rotary dial 202 as last set by the user.

By way of non-limiting example, a user Jane is listening to music on the mobile device 102 while jogging. Jane would like to increase the volume level of the music without having to make eye contact with the mobile device 102. Jane grasps the mobile device 102 in her right hand as shown in FIGS. 1A and 1B with a digit 106 touching the touchscreen display 104. Referring to FIG. 2B, Jane can rotate the mobile device 102 to the right about the y-axis 114, as shown by arrow 204b, to increase the volume level of the music. For example, Jane can rotate her wrist to the right by a small amount, which rotates the mobile device 102 slightly to the right, as shown by arrow 204b of FIG. 2B. The virtual rotary dial 202 moves to example position 202b synchronous with the rotation of the mobile device 102, as shown by arrow 204b.

In another example, Jane, still jogging, would like to lower the volume level of the music playing on the mobile device 102 without having to make eye contact with the mobile device 102. Jane grasps the mobile device 102 in her right hand as shown in FIGS. 1A and 1B with a digit 106 touching the touchscreen display 104. Referring to FIG. 2C, Jane can rotate the mobile device 102 to the left about the y-axis 114, as shown by arrow 204c, in order to decrease the volume level of the music. For example, Jane can rotate her wrist to the left by a small amount, which rotates the mobile device 102 slightly to the left, as shown by arrow 204c. The virtual rotary dial 202 moves to position 202c synchronous with the rotation of the mobile device 102 as shown by arrow 204c.

The rotational movement of the mobile device 102 by a user mimics the physical rotational movement a user would use if grasping and rotating a physical rotary dial. In some implementations, the mobile device 102 can additionally provide haptic and audio feedback synchronous with the rotation of the mobile device 102. For example, as the rotation of the mobile device 102 moves the indicator on the virtual rotary dial 202 through positions on the virtual rotary dial 202, the mobile device 102 can provide haptic feedback (e.g., vibration) and/or audio feedback (e.g., a clicking sound) as Jane rotates the mobile device 102 through positions on the virtual rotary dial 202. This feedback mimics the feedback that a user would perceive if manipulating an actual, physical rotary dial, for example. The mobile device 102 can provide the haptic and audio feedback in addition to the visual feedback of the movement of the indicator on the virtual rotary dial 202. The haptic, audio and visual feedback can be repeated as Jane rotates the mobile device 102 clockwise (e.g., to increase the volume level) or counterclockwise (e.g., to decrease the volume level) indicating the rotation of the virtual rotary dial 202 through one or more discrete steps (positions) along the virtual rotary dial 202. The mobile device 102 can provide a graphical representation of the virtual rotary dial 202 on the touchscreen display 104, and can animate the graphical representation of the virtual rotary dial 202.

In some implementations, a user can manipulate a virtual rotary dial on the mobile device 102 in a similar manner as the virtual rotary dial 202 described with reference to FIGS. 2A-C to perform other functions. For example, the mobile device 102 may allow a user to perform similar manipulations of the mobile device 102 as described in FIGS. 2A-C for use with a virtual rotary dial for changing radio stations among multiple available channels when listening to Internet-radio, for example, on the mobile device 102. In addition, the mobile device 102 can provide the user with haptic and audio feedback as the user rotates the mobile device 102 to select a radio station. For example, the user can rotate the mobile device 102 clockwise and counterclockwise generally about the y-axis 114 in order to change channels and tune to alternate radio stations. The mobile device 102 can provide audio feedback in the form of spoken words, for example, by speaking the station identification (e.g., the call sign). In another example, the mobile device 102 may allow a user to perform similar manipulations of the mobile device 102 as described in FIGS. 2A-C for use with a virtual rotary dial for switching among various genres of music available to the user on the mobile device 102. In addition, the mobile device 102 can provide the user with haptic and audio feedback as the user rotates the mobile device 102 to select a music genre. The mobile device 102 can provide audio feedback in the form of spoken words, for example, by speaking the selected music genre.

Figure 3A:
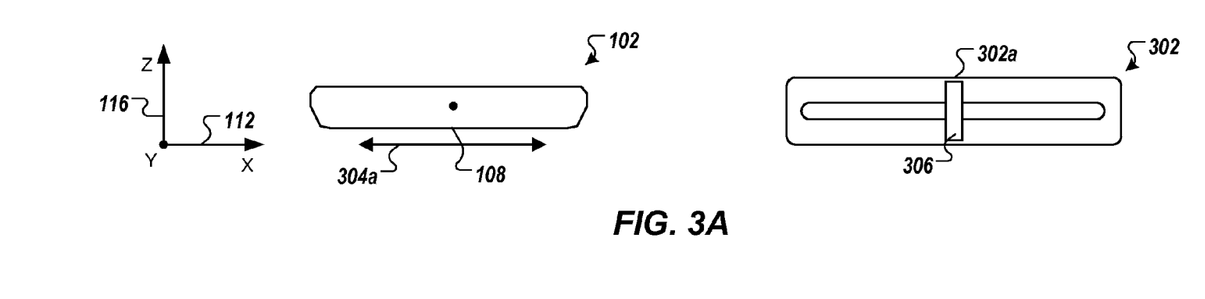
FIGS. 3A-C depict a virtual slider using a mobile device.
Figure 3B:
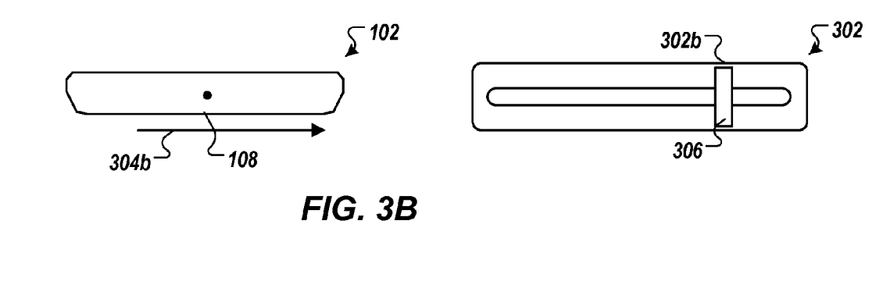
Figure 3C:
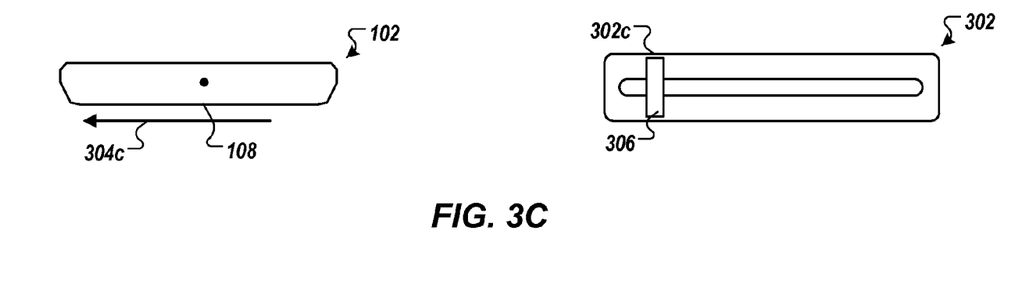

FIGS. 3A-C depict a virtual slider 302 using the mobile device 102. Referring to FIG. 1A, and in some implementations, the mobile device 102 can display the virtual slider 302 that includes a virtual bar 306 on the touchscreen display 104. It is appreciated, however, that the virtual slider 302 need not be displayed. In the example shown in FIGS. 3A-C, the user grips the mobile device 102 as shown in FIGS. 1A-B. The user holds the mobile device 102 in a plane generally parallel to the x-axis 112 and the y-axis 114. FIGS. 3A-C illustrate the linear side-to-side movement (as shown by arrows 304a-c) of the mobile device 102 as shown from the bottom 108 of the mobile device 102 and the respective resultant visual feedback (virtual positions 302a-c of the virtual bar 306) on the virtual slider 302 in response to the linear side-to-side movement.

The virtual slider 302 (a virtual artifact) can be analogous to a physical slider switch (a physical artifact), for example, found on an audio cassette tape player or an audio equalizer system. For example, the virtual slider 302 can indicate fast forwarding or rewinding (and the relative speed of the fast forward or rewind action) within a track of a song played by the mobile device 102. In some implementations, the virtual slider 302 can provide visual feedback by mapping motion events received by the mobile device 102 to the virtual slider 302, for example, while the user is touching the touchscreen display 104 and manipulating the mobile device 102. The user can manipulate the mobile device 102 in order to fast forward or rewind the track and to select the speed at which the fast forwarding or rewinding will occur. The user can manipulate the mobile device 102 in order to fast forward or rewind the track where their hand motion, while gripping the mobile device 102, translates into the "sliding" of the virtual bar 306 of virtual slider 302 linearly to the right or the left, respectively.

FIG. 3A illustrates an initial position 302a for the virtual bar 306 of the virtual slider 302, while the user holds the mobile device 102 in a position generally parallel to the y-axis. For example, Jane is listening to music on the mobile device 102 while riding a bike. Jane would like to fast forward through the currently playing song in order to play the next song without having to make eye contact with the mobile device 102. Jane grasps the mobile device 102 in her right hand as shown in FIGS. 1A and 1B with her digit 106 touching the touchscreen display 104. Referring to FIG. 3B, Jane can move the mobile device 102 by sliding the mobile device 102 to the right generally along the x-axis 112, as shown by arrow 304b, in order to fast forward the song. The virtual bar 306 of the virtual slider 302 moves to position 302b synchronous with the sliding movement, as shown by arrow 304b, of the mobile device 102. The further to the right Jane slides the mobile device 102 the further to the right the virtual bar 306 of the virtual slider 302 moves, and the faster the track will fast forward.

In another example, Jane, still riding, fast forwarded to her favorite song, which is now playing on the mobile device 102 and is almost over. Jane would like to rewind the current track in order to listen to her favorite song, again without having to make eye contact with the mobile device 102. Jane grasps the mobile device 102 in her right hand as shown in FIGS. 1A and 1B with her digit 106 touching the touchscreen display 104. Referring to FIG. 3C, Jane can move the mobile device 102 by sliding the mobile device 102 to the left generally along the x-axis 112, as shown by arrow 304c, in order to rewind the song. The virtual bar 306 of the virtual slider 302 moves to position 302c synchronous with the sliding movement, as shown by arrow 304c, of the mobile device 102. The further to the left Jane slides the mobile device 102 the further to the left the virtual bar 306 of the virtual slider 302 moves and the faster the track will rewind.

In some implementations, the mobile device 102 can additionally provide haptic and audio feedback synchronous with the linear side-to-side sliding movement of the mobile device 102. For example, as the side-to-side movement of the mobile device 102 moves the virtual bar 306 of the virtual slider 302 through positions on the virtual slider 302, the mobile device 102 can provide haptic feedback (e.g., vibration) and audio feedback (e.g., a clicking sound) as Jane moves the mobile device 102 side-to-side through positions on the virtual slider 302. The mobile device 102 can provide the haptic and audio feedback in addition to the visual feedback of the movement of the virtual bar 306 of the virtual slider 302. The haptic, audio and visual feedback can be repeated as Jane slides the mobile device 102 to the right (e.g., to fast forward a track) or to the left (e.g., to rewind a track) indicating the movement of the virtual bar 306 of the virtual slider 302 through one or more discrete steps (positions) along the virtual slider 302. The mobile device 102 can animate the visual feedback as it shows the virtual bar 306 of the virtual slider 302 moving from one position to another along the virtual slider 302.

In some implementations, a user can manipulate a virtual knob on a virtual slider on the mobile device 102 in a similar manner as the virtual bar 306 on the virtual slider 302 described with reference to FIGS. 3A-C to perform other functions. For example, the mobile device 102 may allow a user to perform similar manipulations of the mobile device 102 as described in FIGS. 3A-C for use with a virtual slider for controlling the volume level of music playing on the mobile device 102. In addition, the mobile device 102 can provide the user with haptic and audio feedback as the user moves the mobile device 102 from side-to-side to increase or decrease the volume level. For example, the user can slide the mobile device 102 to the right and to the left along the x-axis 112 in order to increase and decrease, respectively, the volume level of the music playing. In addition, the mobile device 102 can provide the user with haptic feedback (e.g., the mobile device 102 vibrates) and audio feedback (e.g., the mobile device 102 produces a "click" to indicate placement of the virtual bar 306 at a position along the virtual slider 302) as the user slides the mobile device 102 to adjust the volume level.

In some implementations, a virtual slider can be oriented vertically (e.g., rotated 90 degrees relative to the example virtual slider 302 in FIGS. 3A-C). In this case, a user grips the mobile device 102 as shown in FIGS. 1A-B. The user can slide the mobile device 102 generally along the y-axis 114, where the sliding movement of the mobile device 102 results in movement of a virtual bar on the virtual slider through positions on the virtual slider.

Figure 4A:
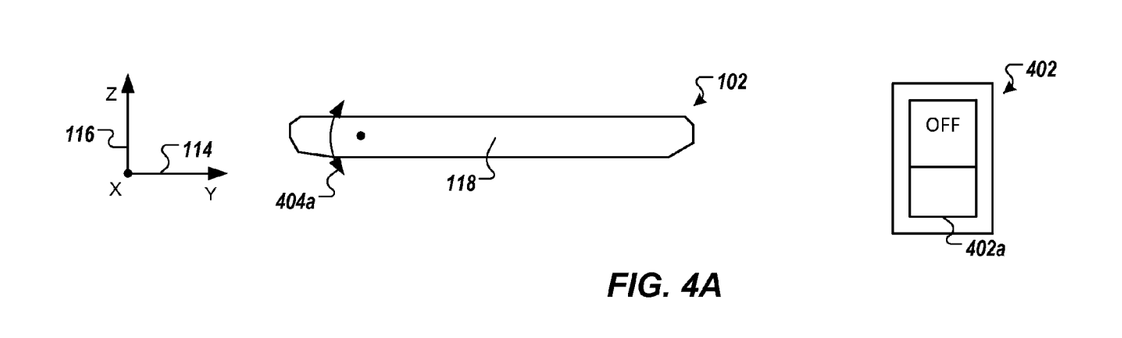
FIGS. 4A-C depict a virtual toggle switch using a mobile device.
Figure 4B:
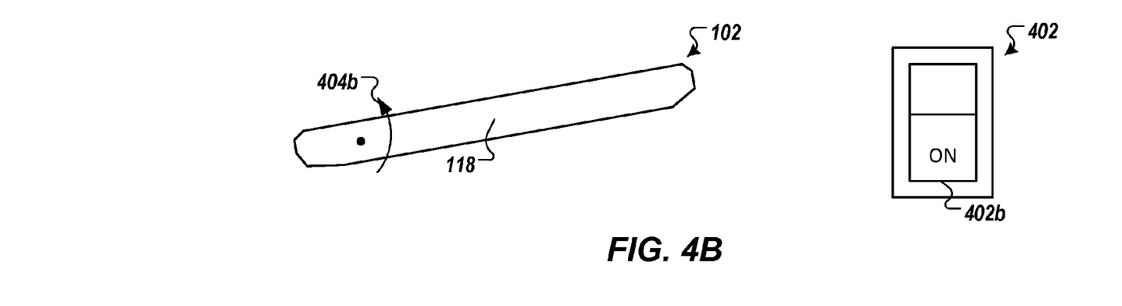
Figure 4C:
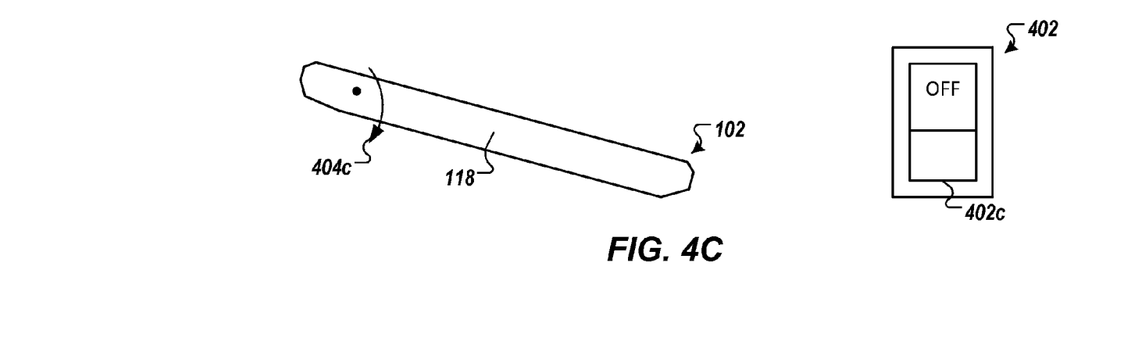

FIGS. 4A-C depict a virtual toggle switch 402 using a mobile device 102. Referring to FIG. 4A, and in some implementations, the mobile device 102 can display the virtual toggle switch 402 on the touchscreen display 104. It is appreciated, however, the virtual toggle switch need not be displayed. In the example shown in FIGS. 4A-C, the user can grip the mobile device 102 as shown in FIGS. 1A-B. FIGS. 4A-C illustrate tilting (as shown by arrows 404a-c) of the mobile device 102 generally about the x-axis 112, as shown from the side 118 of the mobile device 102. In response to the tilting motion and user input (e.g., digit contacting the touchscreen display), the virtual toggle switch 402 can be switched between positions 402a and 402b.

The virtual toggle switch 402 (a virtual artifact) can be analogous to a two-position (e.g., ON/OFF) toggle switch (a physical artifact). For example, the virtual toggle switch 402 can be used to toggle the selection of a user preference or option (e.g., select or deselect the preference, turn the option on or off) for an application running on the mobile device 102. In some implementations, the virtual toggle switch 402 can provide visual feedback of the selection using the virtual toggle switch 402. Visual feedback can be provided, for example, as a graphical representation of the virtual toggle switch 402 on the touchscreen display 104. The graphical representation can be animated in response to motion events received by the mobile device 102. In some implementations, the user can manipulate the mobile device 102 in order to turn a user preference or option on or off, where the user's hand motion, while gripping the mobile device 102, translates into the "flipping" of the virtual toggle switch 402 up or down, respectively.

FIG. 4A illustrates the "off" position 402a for the virtual toggle switch 402, while the user holds the mobile device 102 in a position generally parallel to the y-axis. For example, Jane is listening to music on the mobile device 102 while riding a bike. Jane would like to pause the song she is listening to without having to make eye contact with the mobile device 102. Jane grasps the mobile device 102 in her right hand as shown in FIGS. 1A and 1B with her digit 106 touching the touchscreen display 104. Referring to FIG. 4B, Jane can tilt the mobile device 102 generally about the x-axis 112, as shown by arrow 404b, in order to "turn on" the pause option (e.g., pause the song). For example, Jane can rotate her wrist upward by a small amount, which rotates the mobile device 102 generally about the x-axis 112, as shown by arrow 404b. The virtual toggle switch 402 flips to an "on" position 402b synchronous with the movement of the mobile device 102, as shown by arrow 404b. Jane can stop the motion of her wrist as the virtual toggle switch 402 is flipped to the "on" position and the song will now pause and stop playing.

In another example, Jane would like to resume playing her song on the mobile device 102 without having to make eye contact with the mobile device 102. Jane grasps the mobile device 102 in her right hand as shown in FIGS. 1A and 1B with a digit 106 touching the touchscreen display 104. Referring to FIG. 4C, Jane can tilt the mobile device 102 downward, generally about the x-axis 112, as shown by arrow 404c, in order to "turn off" the pause option (e.g., resume playing the song). For example, Jane can rotate her wrist downward by a small amount, which rotates the mobile device 102 generally about the x-axis 112, as shown by arrow 404c. The virtual toggle switch 402 flips to an "off" position 402c synchronous with the movement of the mobile device 102 as shown by arrow 404c. Jane can stop the motion of her wrist as the virtual toggle switch 402 is flipped to the "off" position and the song will now resume playing.

The up and down movement (tilting) of the mobile device 102 by a user mimics the physical up and down movement a user would use to flip a physical toggle switch on and off. In some implementations, the mobile device 102 can additionally provide haptic and/or audio feedback synchronous with the rotation of the mobile device 102. For example, when the user flips the virtual toggle switch 402 on or off, the mobile device 102 can provide haptic feedback (e.g., vibration) and audio feedback (e.g., a clicking sound) when the virtual toggle switch 402 reaches the "on" position or the "off" position. The mobile device 102 can provide the haptic and/or audio feedback in addition to, or in lieu of visual feedback. The mobile device 102 can animate the visual feedback as it shows the virtual toggle switch 402 being flipped from one position to another. The use of the haptic and/or audio feedback can indicate to the user when the virtual toggle switch 402 is flipped.

In some implementations, a user can manipulate a virtual toggle switch on the mobile device 102 in a similar manner as the virtual toggle switch 402 described with reference to FIGS. 4A-C to perform other functions. For example, the mobile device 102 may allow a user to perform similar manipulations of the mobile device 102 as described in FIGS. 4A-C for use with a virtual toggle switch to select a user preference (e.g., turning an alert on or off when receiving a Short Message Service (SMS) text message on the mobile device 102) for an application (e.g., SMS text messaging application). In addition, the mobile device 102 can provide the user with haptic and audio feedback as the user tilts the mobile device up and down with respect to the y-axis 114 to turn an alert on or off when receiving a SMS text message. For example, the mobile device 102 can provide audio feedback in the form of spoken words, for example, by speaking the selected option for the chosen user preference.

In some implementations, a virtual toggle switch may include more than two positions. A user can manipulate the multiple position virtual toggle switch on the mobile device 102 in a manner similar to the virtual toggle switch 402 described with reference to FIGS. 4A-C to select each position available on the multiple position virtual toggle switch. For example, the user can tilt the mobile device 102 up and down to select positions on the multiple position virtual toggle switch. Each tilt of the mobile device 102 can result in the selection of a position on the multiple position toggle switch.

Figure 5A:
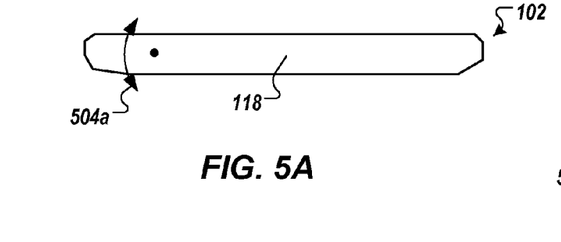
FIGS. 5A-D depict manipulation of a mobile device for scrolling.
Figure 5B:
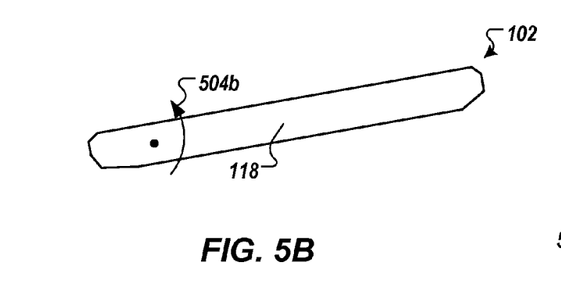
Figure 5C:
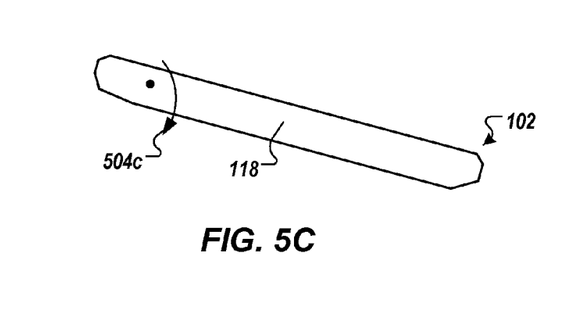
Figure 5D:
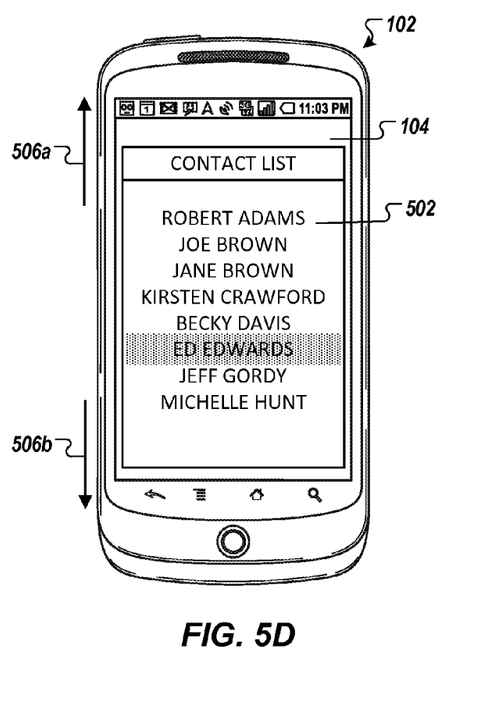

FIGS. 5A-D depict manipulation of a mobile device 102 for scrolling. In the example of FIGS. 5A-D, scrolling includes scrolling through contacts of a contacts list 502. Referring to FIG. 5D, and in some implementations, the mobile device 102 can display the contacts list 502 on the touchscreen display 104. It is appreciated, however, that displaying of the contact list 502 is not required. In the example shown in FIGS. 5A-D, the user can grip the mobile device 102 as shown in FIGS. 1A-B. The user holds the mobile device 102 in a plane generally parallel to the x-axis 112 and the y-axis 114. FIGS. 5A-C illustrate the rotation (as shown by arrows 504a-c) of the mobile device 102 as shown from the side 118 of the mobile device 102. The rotation (as shown by arrows 504a-c) results in the scrolling of the contacts list 502. The upward movement of the mobile device 102 (tilting of the mobile device 102 up, generally rotating about the x-axis 112, (towards the user) as shown by arrow 404b) results in the upward scrolling (as shown by arrow 506a) of the contacts list 502. For example, upward scrolling of the contacts list 502 would result in the highlighted contact moving from "Ed Edwards" to "Becky Davis". The downward movement of the mobile device 102 (tilting of the mobile device 102 down, generally rotating about the x-axis 112, (away from the user) as shown by arrow 404b) results in the downward scrolling (as shown by arrow 506b) of the contacts list 502. For example, downward scrolling of the contacts list 502 would result in the highlighted contact moving from "Ed Edwards" to "Jeff Gordy".

The mobile device 102 can provide visual feedback of the selected contact by highlighting the contact in the contact list 502. The mobile device 102 can provide the visual feedback by mapping motion events received by the mobile device 102 to a selected highlighted contact in the contacts list 502, while the user is touching the touchscreen display 104 and manipulating the mobile device 102. The user can manipulate the mobile device 102 in order to scroll the contacts list 502 and highlight a selected contact where the user's hand motion while gripping the mobile device 102 translates into the up and down scrolling of the contacts list 502.

FIG. 5A illustrates an initial position in the contacts list 502 where the contact "Ed Edwards" is highlighted while the user holds the mobile device 102 in a position generally parallel to the y-axis. For example, Jane is stuck in traffic while headed into the office. She would like to call her assistant, Kirsten, to let her know that she will be getting into the office late without having to make eye contact with the mobile device 102. Jane can grasp the mobile device 102 in her right hand as shown in FIGS. 1A and 1B with her finger 106 touching the touchscreen display 104 along the touchscreen display edge. Referring to FIG. 5B, Jane can move the mobile device 102 upward with respect to the y-axis 114, as shown by arrow 504b, in order to select "Kirsten Crawford" from the contacts list 502. For example, Jane can rotate her wrist upward by a small amount, which moves the mobile device 102 up at an angle to the y-axis 114, as shown by arrow 504b. The highlighted contact can move upward (as shown by arrow 506a) synchronous with the movement of the mobile device 102 (as shown by arrow 504b). Jane can continue to move her wrist upward until "Kirsten Crawford" is the highlighted selected contact from the contacts list 502. In some implementations, Jane can move her wrist in an up/down or rocking type of motion where each up/down motion selects a contact from the contacts list 502.

In addition, for example, Jane would also like to contact her coworker, Michelle, to ask her to facilitate a meeting without having to make eye contact with the mobile device 102. Jane can grasp the mobile device 102 in her right hand as shown in FIGS. 1A and 1B with her finger 106 touching the touchscreen display 104 along the touchscreen display edge. Referring to FIG. 5C, Jane can move the mobile device 102 downward with respect to the y-axis 114, as shown by arrow 504c, in order to select "Michelle Hunt" from the contacts list 502. For example, Jane can rotate her wrist downward by a small amount, which moves the mobile device 102 down at an angle to the y-axis 114, as shown by arrow 504c. The highlighted contact can move downward (as shown by arrow 506b) synchronous with the movement of the mobile device 102 (as shown by arrow 504c). Jane can continue to move her wrist downward until "Michelle Hunt" is the highlighted selected contact from the contacts list 502.

In some implementations, the mobile device 102 can additionally provide haptic and/or audio feedback synchronous with the rotation of the mobile device 102. For example, the mobile device 102 can provide haptic feedback (e.g., vibrate) and/or audio feedback (e.g., a clicking sound) when each contact in the contacts list 502 is selected, while scrolling through the contacts list 502. In addition or alternatively, the audio feedback can be spoken words (e.g., the name of the contact). In some cases, the spoken words may be used as audio feedback when the user pauses motion of the mobile device 102. If the user uses a continuous motion of the mobile device 102, the mobile device 102 can provide audio feedback in the form of a clicking sound to indicate scrolling through a contact. This can be beneficial if the user has a lengthy contacts list and is scrolling from one end of an alphabetically sorted contacts list (e.g., the "A"s) to another end of the alphabetically sorted contacts list (e.g., the "S"s) through a large number of contacts. The mobile device 102 can provide the haptic and audio feedback in addition to, or in lieu of the visual feedback of highlighting of each contact in the contacts list 502 as the user scrolls through the contacts list 502.

In some implementations, a user can manipulate the mobile device 102 in a similar manner as described with reference to FIGS. 5A-C to perform other functions. For example, the mobile device 102 may allow a user to perform similar manipulations of the mobile device 102 as described in FIGS. 5A-C to scroll through a playlist of songs for a music application running on the mobile device 102 allowing the user to select a song from among the songs in the playlist. In addition, the mobile device 102 can provide the user with haptic and/or audio feedback as the user moves the mobile device up and down with respect to the y-axis 114 to scroll the playlist and select a song. For example, the mobile device 102 can provide audio feedback in the form of spoken words, for example, by speaking the title of the selected song.

Figure 6:
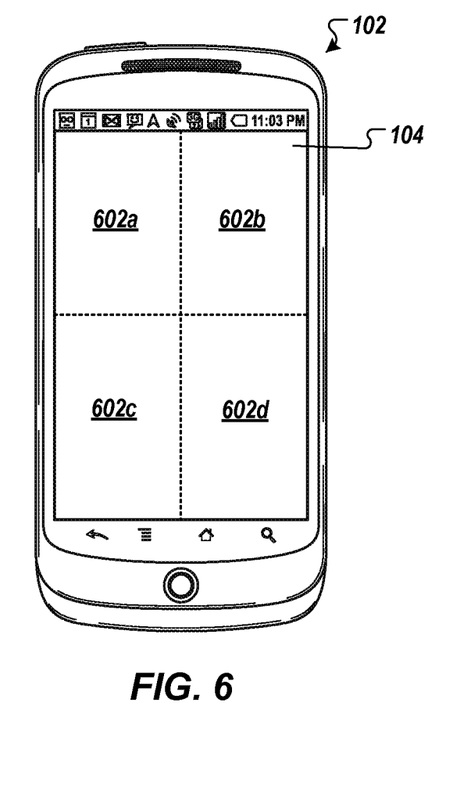
FIG. 6 depicts sections on a touchscreen display of a mobile device.

FIG. 6 illustrates virtual partitions, or sections 602*a-d* on the touchscreen display 104 of the mobile device 102 as shown in FIG. 1A. In some implementations, a user can place their finger in one of the sections 602*a-d*, while gripping the mobile device 102. The placement of the user's finger can select and initiate execution of an application on the mobile device 102. While continuing to place their finger in the selected section, the user can further manipulate virtual artifacts for the mobile device 102, as described with reference to FIGS. 2-5 to control particular functions of the application running on the mobile device 102 without making eye contact with the mobile device 102*b*.

For example, a user grips the mobile device 102 as shown in FIGS. 1A-B. The user holds the mobile device 102 in a plane generally parallel to the x-axis 112 and the y-axis 114, while placing their finger in section 602*a*. While the user is gripping the mobile device 102 in this manner, the mobile device 102 launches and runs a music application. The user can then manipulate the mobile device 102 and use virtual artifacts to control functions provided by the music application (e.g., volume control, fast forwarding and rewinding of a song, selection of a song, pausing of a song). Examples of the use of virtual artifacts are described in FIGS. 2-5.

In another example, a user grips the mobile device 102 as shown in FIGS. 1A-B. The user holds the mobile device 102 in a plane parallel to the x-axis 112 and the y-axis 114, while placing their finger in section 602*b*. While the user is gripping the mobile device 102 in this manner, the mobile device 102 accesses and displays the user's contacts list on the touchscreen display 104. The user can then manipulate the mobile device 102 to scroll their contacts list to select a contact. An example of contact list scrolling was described with reference to FIGS. 5A-D.

In another example, a user grips the mobile device 102 as shown in FIGS. 1A-B. The user can hold the mobile device 102 in a plane generally parallel to the x-axis 112 and the y-axis 114, while placing their finger in section 602*c*. While the user is gripping the mobile device 102 in this manner, the mobile device 102 launches and runs an electronic mail (email) application. The user can then manipulate the mobile device 102 and use virtual artifacts to control functions provided by the email application (e.g., select mail boxes, scroll through messages in a mailbox).

In another example, a user grips the mobile device 102 as shown in FIGS. 1A-B. The user can hold the mobile device 102 in a plane generally parallel to the x-axis 112 and the y-axis 114 while placing their finger in section 602*d*. While the user is gripping the mobile device 102 in this manner, the mobile device 102 launches and runs a voicemail application. The user can then manipulate the mobile device 102 and use virtual artifacts to control functions provided by the voicemail application (e.g., play current voicemail message, play previous voice mail messages).

In some implementations, while the mobile device 102 is running an application (e.g., a music application), a user can place their finger in one of the sections 602*a-d*. The user can manipulate the mobile device 102 in a specific manner dependent on the section 602*a-d* to control a function of the application by using a virtual artifact associated with the function. For example, a user can contact the touchscreen display 104 in section 602*a*, while their mobile device is playing a song. Placement of their finger in section 602*a* can be associated with the use of a virtual rotary dial (e.g., the virtual rotary dial 202 described with reference to FIGS. 2A-C). The user can rotate the mobile device 102, while placing their finger in section 602*a*, to control the volume level of the currently playing song. For example, the user can contact the touchscreen display 104 in section 602*b*, while the music application is running. Placement of their finger in section 602*b* can be associated with the use of a virtual slider (e.g., the virtual slider 302 described with reference to FIGS. 3A-C). The user can move the mobile device 102 from side-to-side, while placing their finger in section 602*b* to control fast forwarding and rewinding of the currently playing song.

For example, the user can contact the touchscreen display 104 in section 602*c*, while the music application is running. Placement of their finger in section 602*c* can be associated with the use of a virtual toggle switch (e.g., the virtual toggle switch 402 described with reference to FIGS. 4A-C). The user can move the mobile device 102 up and down, while placing their finger in section 602*c*, to control the pausing and resuming of the playing of a song. For example, the user can contact the touchscreen display 104 in section 602*d*, while the music application is running. The mobile device 102 can display the user's playlist on the touchscreen display 104. The user can manipulate the mobile device 102 to scroll the playlist to select a song to play. The movement of the mobile device 102 by the user in order to scroll the playlist can be similar to the movement of the mobile device 102 to scroll the contacts list as described with reference to FIGS. 5A-D.

Figure 7:
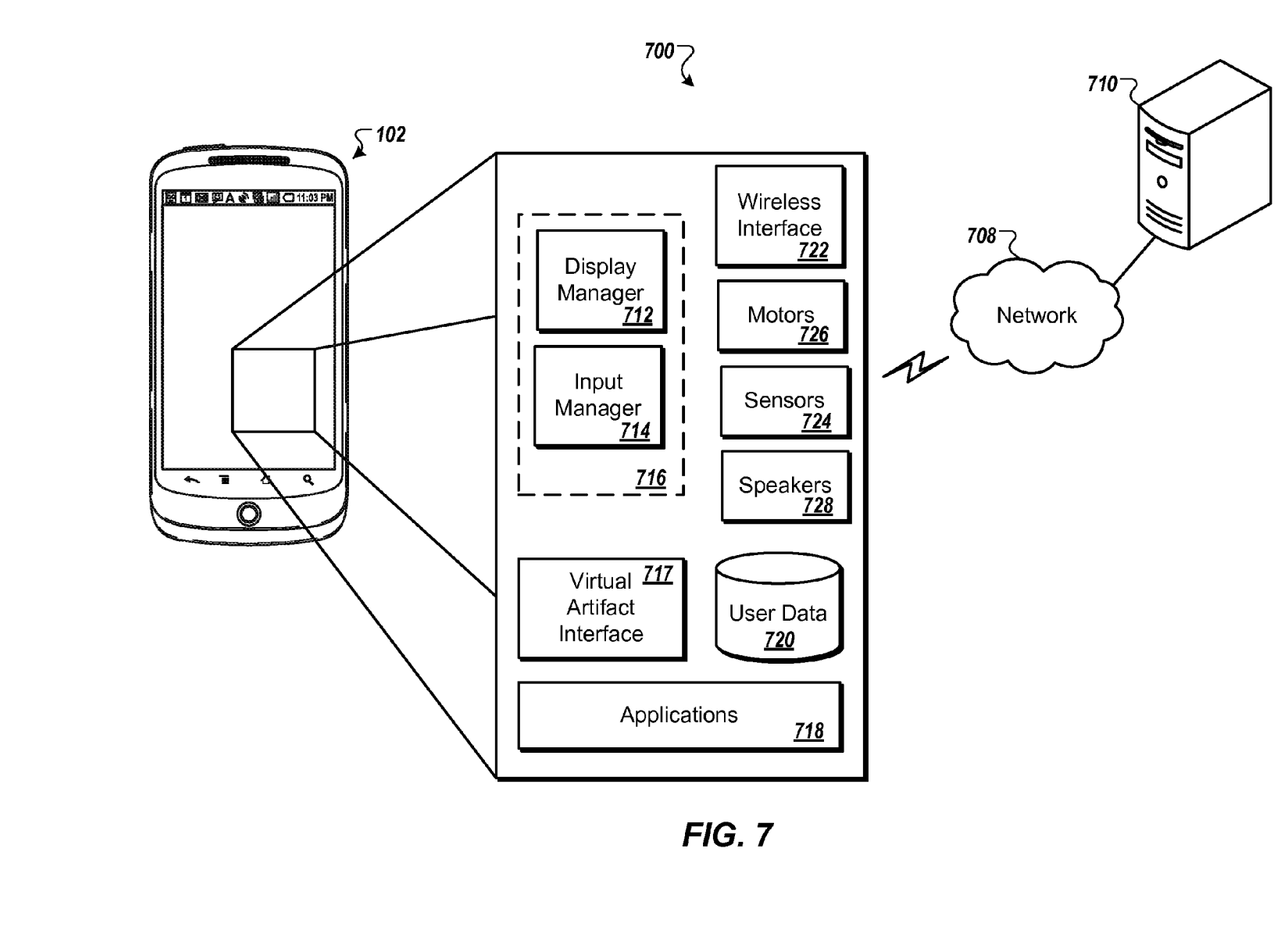
FIG. 7 is a block diagram of a system for providing virtual artifacts on a mobile device.

FIG. 7 is a block diagram of a system 700 for providing virtual artifacts. In general, the system 700 includes a mobile device 102 (e.g., a smart phone) with a touchscreen display 104, where the touchscreen display 104 can be used as a user interface for the mobile device 102. A number of components within the mobile device 102 provide for interaction with the mobile device 102. For purposes of clarity, FIG. 7 shows certain example components of the mobile device 102.

The mobile device 102 can communicate with server 210 through a network 708 using a wireless interface 722. The network 708 can be the internet or a cellular network. For example, the mobile device 102 can direct telephone calls through a telephone network or through a data network using voice over internet protocol (VOIP). In addition, the mobile device 102 can transmit other forms of data over the internet, for example, data in the form of Hypertext Transfer Protocol (HTTP) requests that are directed at particular web sites. The mobile device 102 may receive responses, for example, in forms that can include but are not limited to mark-up code for generating web pages, media files, and electronic messages.

A number of components running on one or more processors included in the mobile device 102 enable a user to interact with the touchscreen display 104 to provide input and to receive visual output. For example, an interface manager 716 can manage interaction with the touchscreen display 104, and includes a display manager 712 and an input manager 214.

The display manager 712 can manage the information displayed to a user using the touchscreen display 104. For example, an operating system running on the mobile device 102 can use the display manager 712 to arbitrate access to the touchscreen display 104 for a number of applications 718 running on the mobile device 102. For example, the mobile device 102 can display a number of applications, each in its own window on the touchscreen display 104, and the display manager 712 can control what portions of each application are shown on the touchscreen display 104. In another example, the display manager can control the displaying of a virtual artifact.

The input manager 714 can control the handling of data received from a user using the touchscreen display 104 or other input mechanisms. For example, the input manager 714 can coordinate with the display manager 712 to identify where, on the touchscreen display 104, a user is entering information so that that the mobile device 102 may understand the context of the input. In addition, the input manager 214 may determine which application or applications should be provided with the input. For example, input to the mobile device 102 using the touchscreen display 104 can be a user placing their finger on the touchscreen display while manipulating the mobile device 102. The area of the mobile device 102 touched by the user's finger can determine which of the applications 718 the mobile device 102 launches and runs as described with reference to FIG. 6. In some cases, the area of the mobile device 102 touched by the user's finger can determine which of the functions of an application running on the mobile device 102 is invoked and controlled by the user using a virtual artifact.

A virtual artifact interface 717 can control the functions of virtual artifacts associated with the current application running on the mobile device 102. The virtual artifact interface 717 can use one or more sensors 724 to sense the movement of the mobile device 102. Example sensors 724 can include one or more accelerometers, a gyroscope and a compass. The mobile device 102 can determine a direction and speed of movement using signals generated by the one or more sensors 724. The virtual artifact interface 717 can translate the movement of the mobile device 102 using the signals from the sensors 724 into states or positions of a virtual artifact. The virtual artifact interface 717 can synchronize the movements of the mobile device 701 with a virtual artifact in order to perform a specific function for an application.

The mobile device 102 can provide visual, haptic and audio feedback as the user manipulates the virtual artifact. The mobile device 102 can use the virtual artifact interface 717 to provide visual feedback using the display manager 712 to display a virtual artifact on the touchscreen display 104. The mobile device 102 can user the virtual artifact interface 717 to provide audio feedback using the one or more processors installed in the mobile device 102 to generate audio tones (e.g., beeps, clicks) for audio output on one or more speakers 728. The mobile device 102 can user the virtual artifact interface 717 to provide audio feedback using the one or more processors installed in the mobile device 102 to generate spoken words for output on the one or more speakers 728. The spoken words can be based on a selected item or action by a user manipulating the mobile device 102 while controlling a virtual artifact to select the item or action.

The mobile device 102 can user the virtual artifact interface 717 to provide haptic feedback by driving one or more motors 726 in order to vibrate the mobile device 102. The one or more motors 726 can vibrate the mobile device 102 along one or more axes. For example, one motor can vibrate the mobile device 102 along the x-axis 112 and another motor can vibrate the mobile device 102 along the y-axis. In some implementations, the mobile device 102 can activate multiple motors simultaneously to vibrate the mobile device 102 along both the x-axis 112 and the y-axis 114 at the same time. In some implementations, the mobile device 102 can activate one motor to vibrate the mobile device 102 along the x-axis 112. In some implementations, the mobile device 102 can activate one motor to vibrate the mobile device 102 along the y-axis 114.

A user data database 220 may store information about particular user preferences or parameters. For example, the database 220 may store an identifier of an application that is to implement virtual artifacts and receive input from the interface manager 216 and the one or more sensors 724 for use with the virtual artifact interface 717. For example, a music application may be set by default to implement virtual artifacts while the user touches the touchscreen display 104 by placing their finger on the edge of the touchscreen display 104.

In some implementations, the rate of movement of the mobile device 102 by a user can determine the cadence or rhythm of the haptic and/or audio feedback. For example, the mobile device 102 can beep at a faster rate and/or vibrate at a faster rate as the user manipulates and moves the mobile device 102 more quickly. In addition or alternatively, the mobile device 102 can beep and/or vibrate at a faster rate the longer the user manipulates or moves the mobile device 102 to control a virtual artifact.

In some implementations, the mobile device 102 can determine the type and format of the haptic and/or audio feedback based on the application receiving the input associated with a virtual artifact. For example, the mobile device 102 may vibrate using a particular cadence associated with a music application running on the mobile device 102 when the user interacts with the virtual artifact. In addition, the mobile device 102 may make an audible sound (e.g., a clicking noise or a beep) associated with the music application running on the mobile device, when the user interacts with the virtual artifact.

In some implementations, the mobile device 102 can determine the type and format of the haptic and/or audio feedback based on the virtual artifact. For example, the mobile device 102 may provide a clicking noise as audio feedback as a user rotates the virtual rotary dial 202 through its positions. In addition, the mobile device 102 may provide a short, quick vibration as haptic feedback as the user passes through positions on the virtual rotary dial. In another example, the mobile device may provide a beeping sound as audio feedback as the user moves the virtual slider 302 from side-to-side increasing the frequency of the beeping sounds as the user moves the virtual slider 302 further to the right or left. In addition, the mobile device 102 may vibrate as the user moves the virtual slider 302 from side-to-side increasing the intensity of the vibrations as the user moves the virtual slider 302 farther to the right or left.

Figure 8:
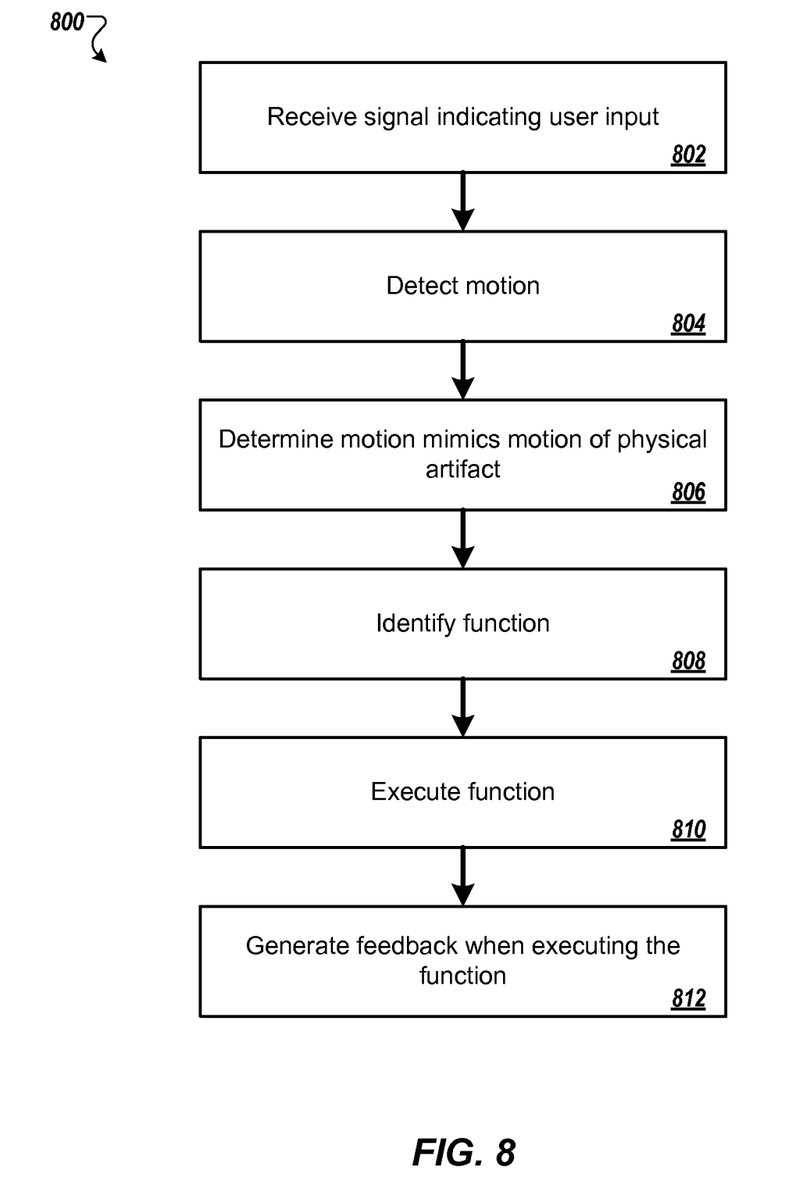
FIG. 8 is a flowchart of an example process for implementing a virtual artifact on a mobile device.

FIG. 8 is a flowchart of an example process 800 for implementing a virtual artifact. The process 800 is described with reference to FIG. 7. The process 800 starts by receiving a signal indicating user input to the touchscreen display 104 (802). For example, the mobile device 102 receives a signal from the input manager 714 that the user has put their finger on the touchscreen display 104. The process 800 detects motion of the mobile device (e.g., mobile device 102) (804). For example, the mobile device 102 uses the one or more sensors 724 to detect motion of the mobile device 102. The motion can include but is not limited to any of the user movements or manipulations of the mobile device 102 as described in FIGS. 2-5. The process 800 determines that the motion mimics motion associated with a physical artifact (806). For example, the mobile device 102 determines that the motion detected by the one or more sensors 724 mimics, for example, the rotation of a physical rotary dial as described in FIGS. 2A-C.

The process 800 identifies a function based on the user input and the detected motion where the function corresponds to a function that can be physically performed using the physical artifact (808). For example, referring to FIGS. 2A-C, the mobile device determines that the placing of the user's finger on the edge of the touchscreen display 104 along with the rotation of the mobile device 102 by the user about the y-axis 114 mimics the rotating of a physical rotary dial to control the volume level of music playing on the mobile device 102. The mimicked motion can increase or decrease the volume level of the song being played by a music application running on the mobile device 102. The process 800 executes the function on the mobile device (e.g., mobile device 102) (810). For example, the mobile device 102 increases or decreases the volume level of the song playing on the mobile device 102 based on the detected motion as related to a position associated with the physical artifact where the position corresponds to a volume level. The process 800 generates feedback to the user indicating execution of the function (812). The mobile device 102 generates the feedback synchronous with the detected motion of the mobile device 102. For example, as the user rotates the virtual rotary dial 202, the mobile device 102 can use one or more motors 726 to vibrate the mobile device 102 to provide haptic feedback to the user synchronous with the rotation of the virtual rotary dial 202. In addition or alternatively, as the user rotates the virtual rotary dial 202, the mobile device 102 can use speakers 728 to provide an audible sound (e.g., a beep or click) to provide audio feedback to the user synchronous with the rotation of the virtual rotary dial 202.

Implementations of the present disclosure and all of the functional operations provided herein can be realized in digital electronic circuitry, or in computer software, firmware, or hardware, including the structures disclosed in this specification and their structural equivalents, or in combinations of one or more of them. Implementations of the present disclosure can be realized as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this disclose can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, implementations of the present disclosure can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure includes some specifics, these should not be construed as limitations on the scope of the disclosure or of what may be claimed, but rather as descriptions of features of example implementations of the disclosure. Certain features that are described in this disclosure in the context of separate implementations can also be provided in combination in a single implementation. Conversely, various features that are described in the context of a single implementation can also be provided in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the present disclosure have been described. Other implementations are within the scope of the following claims. For example, the actions recited in the claims can be performed in a different order and still achieve desirable results. A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A mobile computing device, comprising:
a touchscreen display;
a processor in communication with the touchscreen display; and
a computer-readable medium that is coupled to the processor and that has instructions stored thereon which, when executed by the processor, cause the processor to perform operations comprising:
receiving, at the mobile computing device, an indication that the touchscreen display is being contacted in a first section of the touchscreen display, the first section of the touchscreen display being one of a plurality of sections of the touchscreen display;
detecting, while the mobile computing device continues to receive the indication that the touchscreen display is being contacted in the first section of the touchscreen display, a first motion of the mobile computing device that mimics motion associated with manipulating a first physical artifact;
in response to detecting the first motion of the mobile computing device that mimics the motion associated with manipulating the first physical artifact while the mobile computing device continues to receive the indication that the touchscreen display is being contacted in the first section of the touchscreen display:
selecting, from a collection of functions that the mobile computing device is capable of performing, a first function for the mobile computing device to perform based on the first function corresponding to the first motion of the mobile computing device that mimics the motion associated with manipulating the first physical artifact, and
performing the first function with the mobile computing device;
receiving, at the mobile computing device, an indication that the touchscreen display is being contacted in a second section of the touchscreen display, the second section of the touchscreen display being one of the plurality of sections of the touchscreen display other than the first section of the touchscreen display;
detecting, while the mobile computing device continues to receive the indication that the touchscreen display is being contacted in the second section of the touchscreen display, a second motion of the mobile computing device that mimics motion associated with manipulating a second physical artifact, the second physical artifact being different than the first physical artifact; and
in response to detecting the second motion of the mobile computing device that mimics the motion associated with manipulating the second physical artifact while the mobile computing device continues to receive the indication that the touchscreen display is being contacted in the second section of the touchscreen display:
selecting, from the collection of functions that the mobile computing device is capable of performing, a second function for the mobile computing device to perform based on the second function corresponding to the second motion of the mobile computing device that mimics the motion associated with manipulating the second physical artifact, and
performing the second function with the mobile computing device, the second function being different than the first function.

2. The device of claim 1, wherein performing the first function includes adjusting a volume of sound generated using the mobile computing device.

3. The device of claim 2, wherein the adjusting comprises increasing the volume of sound generated using the mobile computing device in response to identifying that the first motion of the mobile computing device is (i) rotational motion in a first rotational direction or is (ii) linear motion in a first linear direction.

4. The device of claim 3, wherein the adjusting comprises decreasing the volume of sound generated using the mobile computing device in response to identifying that the second motion of the mobile computing device is (i) rotational motion in a second rotational direction opposite the first rotational direction or is (ii) linear motion in a second linear direction opposite the first linear direction.

5. The device of claim 1, wherein the first physical artifact is selected from a group of physical artifacts consisting of a knob, a dial, a button, a slider, and a switch.

6. The device of claim 5, wherein:
the second physical artifact is selected from the group of physical artifacts consisting of the knob, the dial, the button, the slider, and the switch, and
the second physical artifact is another physical artifact that is from the group of physical artifacts and that is different than the first physical artifact.

7. The device of claim 5, wherein the plurality of sections of the touchscreen display collectively span an entirety of the touchscreen display, wherein each section from the plurality of sections corresponds to a respective physical artifact such that the mobile computing device is configured to select a respective function from the collection of functions corresponding to a respective motion associated with manipulating the respective physical artifact that corresponds to the respective section of the touchscreen display.

8. The device of claim 1, wherein the operations further comprise executing, in response to detecting the first motion of the mobile computing device that mimics the motion associated with manipulating the first physical artifact while the mobile computing device continues to receive the indication that the touchscreen display is being contacted in the first section of the touchscreen display, an application on the mobile computing device, wherein the first function is performed within the application.

9. The device of claim 8, wherein the application comprises a media playing application and performing the first function comprises adjusting a volume of sound generated by the mobile computing device for audio played by the application.

10. The device of claim 8, wherein the application comprises an Internet-radio application and performing the first function comprises changing a channel in the Internet-radio application.

11. The device of claim 1, wherein the first motion of the mobile computing device comprises rotation, acceleration, linear movement, or tilting.

12. The device of claim 1, wherein the first motion of the mobile computing device is detected using an accelerometer.

13. The device of claim 1, wherein the operations further comprise, in response to detecting the first motion of the mobile computing device that mimics the motion associated with manipulating the first physical artifact while the mobile computing device continues to receive the indication that the touchscreen display is being contacted in the first section of the touchscreen display, generating feedback to a user of the mobile computing device, the feedback indicating performance of the first function.

14. The device of claim 13, wherein the feedback comprises at least one of audible feedback and haptic feedback.

15. The device of claim 13, wherein the feedback includes a cadence, and wherein a rate of the cadence is based on a speed of the first motion of the mobile computing device.

16. The device of claim 15, wherein the rate of the cadence is configured to increase in response to detecting that the speed of the first motion of the mobile computing device has increased.

17. The device of claim 13, wherein generating the feedback to the user of the mobile computing device comprises driving a motor of the mobile computing device to generate haptic feedback.

18. The device of claim 1, wherein the mobile computing device is configured, in response to (i) detecting third motion of the mobile computing device that mimics the motion associated with manipulating the first physical artifact and (ii) determining that the touchscreen display is not being contacted, to not perform the first function that corresponds to the first motion of the mobile computing device that mimics the motion associated with manipulating the first physical artifact.

19. The device of claim 1, wherein the operations further comprise displaying, on the touchscreen display, a first virtual artifact that has a visual appearance resembling the first physical artifact,
  wherein the first motion of the computing device is detected while the first virtual artifact is being displayed on the touchscreen display of the mobile computing device.

20. The device of claim 19, wherein the operations further comprise animating the first virtual artifact in response to detecting the first motion of the mobile computing device.

21. A non-transitory computer-readable medium having instructions stored thereon that, when executed by one or more processors, cause performance of operations comprising:
  receiving, at a mobile computing device, an indication that a touchscreen display of the mobile computing device is being contacted in a first section of the touchscreen display, the first section of the touchscreen display being one of a plurality of sections of the touchscreen display;
  detecting, while the mobile computing device continues to receive the indication that the touchscreen display is being contacted in the first section of the touchscreen display, a first motion of the mobile computing device that mimics motion associated with manipulating a first physical artifact;
  in response to detecting the first motion of the mobile computing device that mimics the motion associated with manipulating the first physical artifact while the mobile computing device continues to receive the indication that the touchscreen display is being contacted in the first section of the touchscreen display:
    selecting, from a collection of functions that the mobile computing device is capable of performing, a first function for the mobile computing device to perform based on the first function corresponding to the first motion of the mobile computing device that mimics the motion associated with manipulating the first physical artifact, and
    performing the first function with the mobile computing device;
  receiving, at the mobile computing device, an indication that the touchscreen display is being contacted in a second section of the touchscreen display, the second section of the touchscreen display being one of the plurality of sections of the touchscreen display other than the first section of the touchscreen display;
  detecting, while the mobile computing device continues to receive the indication that the touchscreen display is being contacted in the second section of the touchscreen display, a second motion of the mobile computing device that mimics motion associated with manipulating a second physical artifact, the second physical artifact being different than the first physical artifact; and
  in response to detecting the second motion of the mobile computing device that mimics the motion associated with manipulating the second physical artifact while the mobile computing device continues to receive the indication that the touchscreen display is being contacted in the second section of the touchscreen display:
    selecting, from the collection of functions that the mobile computing device is capable of performing, a second function for the mobile computing device to perform based on the second function corresponding to the second motion of the mobile computing device that mimics the motion associated with manipulating the second physical artifact, and
    performing the second function with the mobile computing device, the second function being different than the first function.

22. A computer-implemented method, comprising:
  receiving, at a mobile computing device, an indication that a touchscreen display of the mobile computing device is being contacted in a first section of the touchscreen display, the first section of the touchscreen display being one of a plurality of sections of the touchscreen display;
  detecting, while the mobile computing device continues to receive the indication that the touchscreen display is being contacted in the first section of the touchscreen display, a first motion of the mobile computing device that mimics motion associated with manipulating a first physical artifact;
  in response to detecting the first motion of the mobile computing device that mimics the motion associated with manipulating the first physical artifact while the mobile computing device continues to receive the indication that the touchscreen display is being contacted in the first section of the touchscreen display:
- selecting, from a collection of functions that the mobile computing device is capable of performing, a first function for the mobile computing device to perform based on the first function corresponding to the first motion of the mobile computing device that mimics the motion associated with manipulating the first physical artifact, and
- performing the first function with the mobile computing device;

receiving, at the mobile computing device, an indication that the touchscreen display is being contacted in a second section of the touchscreen display, the second section of the touchscreen display being one of the plurality of sections of the touchscreen display other than the first section of the touchscreen display;

detecting, while the mobile computing device continues to receive the indication that the touchscreen display is being contacted in the second section of the touchscreen display, a second motion of the mobile computing device that mimics motion associated with manipulating a second physical artifact, the second physical artifact being different than the first physical artifact; and in response to detecting the second motion of the mobile computing device that mimics the motion associated with manipulating the second physical artifact while the mobile computing device continues to receive the indication that the touchscreen display is being contacted in the second section of the touchscreen display:
- selecting, from the collection of functions that the mobile computing device is capable of performing, a second function for the mobile computing device to perform based on the second function corresponding to the second motion of the mobile computing device that mimics the motion associated with manipulating the second physical artifact, and
- performing the second function with the mobile computing device, the second function being different than the first function.

* * * * *